United States Patent
Maguire et al.

[15] 3,678,162

[45] July 18, 1972

[54] INHIBITING OR PREVENTING THROMBUS FORMATION WITH 2-METHYLTHIOADENOSINE-5'-MONOPHOSPHATE

[72] Inventors: Mary H. Maguire; Geoffrey R. Gough, both of Mosman; Frank Michal, Lane Cove, New South Wales, all of Australia

[73] Assignee: The University of Sydney, Sydney, New South Wales, Australia

[22] Filed: Dec. 8, 1969

[21] Appl. No.: 883,354

[30] Foreign Application Priority Data

Dec. 13, 1968 Australia...................................47789

[52] U.S. Cl. ........................................424/180, 260/211.5 R
[51] Int. Cl. ...........................................................A61k 27/00
[58] Field of Search...............................424/180; 260/211.5

[56] References Cited

UNITED STATES PATENTS

| | | |
|---|---|---|
| 3,408,206 | 10/1968 | Yamazaki et al. ...................260/211.5 |
| 3,471,471 | 10/1969 | Maguire..............................260/211.5 |

Primary Examiner—Jerome D. Goldberg
Assistant Examiner—Vincent D. Turner
Attorney—William H. Edgerton, Richard D. Foggio, Joan S. Keps, Alan D. Lourie and Joseph A. Marlino

[57] ABSTRACT

2-Methylthioadenosine-5'-monophosphate and the ammonium, sodium and potassium salts thereof and pharmaceutical compositions and methods of inhibiting or preventing thrombus formation with these compounds.

4 Claims, No Drawings

INHIBITING OR PREVENTING THROMBUS FORMATION WITH 2-METHYLTHIOADENOSINE-5'-MONOPHOSPHATE

This invention relates to new chemical compounds, namely 2-methylthioadenosine-5'-monophosphate and the ammonium, sodium and potassium salts thereof. This invention also relates to pharmaceutical compositions and methods of inhibiting or preventing thrombus formation with these compounds.

It has been found that 2-methylthio-adenosine-5'-monophosphate is useful for the inhibition or prevention of thrombus formation in, for example, post-operative situations, cases of heart implants with pacemakers and artificial valves, organ transplants, atherosclerosis, venousthrombotic states and conditions where platelet adhesion is excessive.

The activity of 2-methylthioadenosine-5'-monophosphate is demonstrated by the following procedures.

2-Methylthioadenosine-5'-monophosphate at 0.5 μM causes a 50 percent inhibition of adenosine diphosphate (ADP)-induced aggregation of sheep blood platelets in platelet-rich plasma in vitro. Similarly a 50 percent inhibition of the ADP-mediated aggregation of dog and human platelets is caused by 1.3 μM and 8.6 μM 2-methylthioadenosine-5'-monophosphate. The inhibition produced is of long duration. The technique used for the quantitative measurement of platelet aggregation is described in the article by M.H. Maquire and F. Michal, Nature, 217,571 (1968). 2-Methylthioadenosine-5'-monophosphate reduces the stickiness of platelets in vivo, demonstrated by the following procedures.

2-Methylthioadenosine-5'-phosphate (250-500 μg/kg) was administered to dogs anaesthetized with nembutal or chloralose and readministered at intervals of 60 to 90 minutes. Blood was sampled at hourly intervals, and the response to ADP of the platelets in plateletrich plasma isolated from the blood samples was studied. A significant reduction in the ADP-induced aggregation of platelets was observed, and the platelet aggregates formed disaggregated more rapidly than normal. Results were obtained from experiments on seven dogs.

Thrombi can be induced in exposed cerebral cortex arterioles in the rat by low voltage electrical stimulation applied across the vessel wall. 2-Methylthio-adenosine-5'-monophosphate when injected intravenously in doses of 150-200 μg/kg significantly increased the time a thrombus took to form, compared to the time in which control thrombi formed in the absence of the drug, for a period of approximately 60 minutes after each injection. Results were obtained from experiments on seven different animals.

At doses of 2,000 μg/kg injected intravenously into anaesthetized rats and guinea pigs, 2-methyl-thioadenosine-5'-monophosphate does not produce arrhythmias or heart block and does not cause substantial depression of arterial blood pressure.

Doses of 75 mg/kilogram administered intravenously in mice showed no toxic effects.

2-Methylthioadenosine-5'-monophosphate may be prepared for example from 2-methylthioadenosine by either of the following processes;

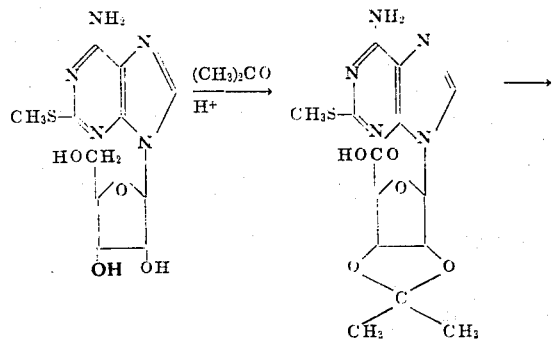

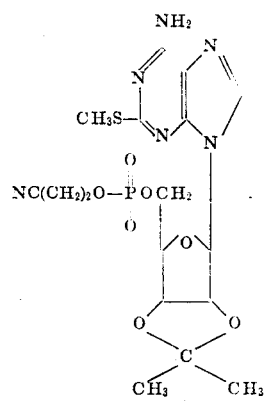

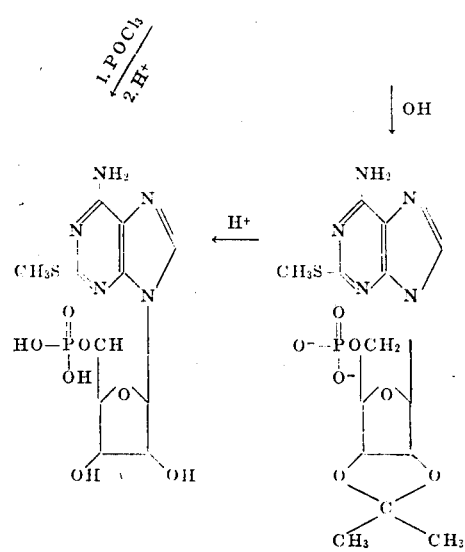

According to the above procedure, the 2' and 3'-hydroxy groups of 2-methyl-thioadenosine are protected by treating with acetone in the presence of an acid condensing agent such as for example p-toluene sulphonic acid to give 2-methylthio-2',3'-isopropylideneadenosine.

The 2-methylthio-2',3'-isopropyl-ideneadenosine is then reacted with β-cyanoethylphosphate in a solvent such as pyridine, using dicyclohexylcarbodimide as a condensing agent.

The β-cyanoethyl and isopropylidene groups are removed with, respectively, alkali (for example lithium hydroxide) and acid (low pH) to give 2-methyl-thioadenosine-5'-monophosphate. This product may be purified by treating with barium hydroxide to give the barium salt, converting the barium salt to the ammonium salt by ion-exchange chromatography, purifying the ammonium salt by column chromatography and then converting to the free acid, 2-methylthioadenosine-5'-monophosphate, by elution from an anion exchange column with formic acid.

Alternatively the 2-methylthio-2',3'-isopropylideneadenosine is treated with phosphorus oxychloride in the presence of trimethyl or triethyl phosphate. Excess phosphorus oxychloride is hydrolyzed with aqueous lithium hydroxide. Lithium phosphate is removed, the solution is heated at pH 2 for 30 minutes and 2-methylthioadenosine-5'-monophosphate is isolated as the barium salt, and purified as described in the first procedure.

The free acid may be converted to its sodium or potassium salt by passage through a sodium or potassium cation exchange column and evaporation to dryness.

For therapeutic use, 2-methylthio-adenosine-5'-monophosphate is preferably administered in the form of a pharmaceutical composition comprising the active ingredient in combination with a pharmaceutical carrier. These pharmaceutical compositions also fall within the scope of the present invention. Advantageously, the compositions can be made up in a dosage unit form appropriate to the desired mode of administration, which may be intravenous or intramuscular.

The pharmaceutical carrier may be for example, pyrogen free normal saline.

The following examples illustrate the invention and are not intended to limit the scope thereof.

EXAMPLE 1

2-methylthio-2',3' O-isopropylidene adenosine a. Pure 2-methylthioadenosine (2 g) and p-toluene sulphonic acid (12.8 g) were suspended in dry acetone (450 ml) and the mixture was stirred for 90 minutes with a Vibromix. After 10 min. a clear solution was obtained, after 30 min. crystals separated. The mixture was poured into 350 ml of ice water containing 13.4 g of $NaHCO_3$, and the solution obtained was evaporated to dryness at 30°–35°.

The residue was extracted by repeated heating of the reaction product with acetone (8 × 500 ml) and decanting of the acetone extract. Evaporation of acetone left an oil which was dissolved in 500 ml of boiling $H_2O$, charcoaled and the solution evaporated to 20 ml in vacuo at 30°. Crystals separated and were filtered (1.55 g) and crystallized again by evaporation from an aqueous methanolic solution. The aqueous mother liquors yielded another 200 mg and recrystallization of the combined products from $H_2O$ gave needles (1.4 g) mp 177°–178.5°, chromatographically homogeneous. Analysis: $C_{14}H_{19}NO_4S$ req. C 47.6; H 5.38; N 19.8. Found: 0 47,66; H 5.28; N 19.70%.

It has been found advantageous to use a dimethoxypropane : acetone (1:10) mixture in the initial acetonation step, to use a longer reaction time, and to extract the product from the $NaHCO_3$ evaporation residue with chloroform instead of acetone.

b. 2-Methylthioadenosine (2.5 g) and p-toluene sulphonic acid (16 g) were suspended in dry acetone (750 ml) containing 2,2-dimethoxypropane (40 ml) and the mixture was stirred for 4 hours, then poured into ice water (400 ml) containing $NaHCO_3$ (18.2 g). The solution was evaporated to dryness and the residue was dried in vacuo over NaOH. The residue was then extracted with boiling chloroform (3 × 100 ml). Evaporation of chloroform left an oil which was crystallized from hot water yielding 2.2 g (78 percent of theory) of the pure product.

2-Methylthioadenosine-5'-monophosphoric acid a. 1.06 g (3 moles) of 2-methylthio-2',3'-O-isopropylidene adenosine in 25 ml pyridine was allowed to stand at room temperature with 12 ml of 1 mmoles/ml stock solution of β-cyanoethyl phosphate and 6 g of dicyclohexylcarbodiimide. The reaction was terminated after 24 hr. by the addition of 5 ml of water and the resultant mixture evaporated to dryness. 120 ml of 0.4N lithium hydroxide solution was added to the residue and the mixture was refluxed for 1 hr to remove the cyanoethyl protecting group. It was then cooled and filtered, and the filtrate was passed through a column of Bio-Rad AG 50W–X4 cation exchange resin ($H^+$ form) to replace lithium by hydrogen ions. The acidic effluent was left at room temperature overnight to effect cleavage of the isopropylidene protecting group. It was then concentrated to about 150 ml and its pH adjusted to 7.5 with barium hydroxide solution. Barium phosphate which precipitated was centrifuged off and the supernatant was treated with two volumes of ethanol and allowed to stand overnight. The crude nucleotide barium salt which then settled out was collected by centrifugation, washed with ethanol, acetone and ether and dried, yielding 1.9 g.

300 mg of crude barium salt was converted to the ammonium salt by passage through a column of cation exchange resin. It was then applied in a small volume of isopropanol: 0.25 M aqueous ammonium bicarbonate (2:1) to a 2.5 × 35 cm column of cellulose packed in the same solvent. Elution with this solvent yielded a pure fraction of the desired nucleotide as the ammonium salt. Ammonium bicarbonate from the solvent was removed by repeated evaporations of water and the residue was converted from the ammonium salt form to the free acid by absorbing it on a column of Bio-Rad AG1–X4 anion exchange resin, washing the column well with water, then eluting it with 4N formic acid. The fractions of the effluent which contained the nucleotide were concentrated and dried to yield 2-methyl-thioadenosine-5'-monophosphoric acid as a white solid (135 mg, approx. 64 percent yield from the iso-propylidene derivative).

The solid was recrystallized twice from water to give white needles, m.p. 192°–195° C (decomposition). Analysis: $C_{11}H_{16}NO_7PS$. $H_2O$ req. C,32.12; H,4.41; N,17.03; P,7.53. Found: C,31.77; H,4.42; N,16.94; P, 7.45 percent.

The isolation of 2-methylthioadenosine-5'-phosphate may also be achieved advantageously without proceeding via the barium salt as described hereunder in (b).

b. 1.06 g of 2-methylthio-2',3'-O-isopropylidene adenosine was treated as described above up to the step involving reflux with 0.4N lithium hydroxide. The reaction mixture was then filtered and the filtrate was adjusted to pH 1.5 with 89 percent phosphoric acid. The acid solution was heated at 70°–80° C for 2 hrs, then treated with dilute lithium hydroxide solution until the pH reaches 9. Precipitated lithium phosphate was filtered off. The filtrate was evaporated to c. 30 ml. and passed through 2.0 × 30 cm column of Bio-Rad AG 50W –X4 ($H^+$) which retained the nucleotide. The column was washed with 500 ml water then eluted with 300 ml of 1 M $NH_4OH$. The eluate was evaporated to 15 ml. then strongly acidified with formic acid. 2-Methylthioadenosine-5'-monophosphate began to crystallize out immediately.

The mixture was refrigerated overnight then filtered to give 899 mg of chromatographically homogeneous white needles (73 percent yield).

A further 266 mg of crude product was isolated from the mother liquor by absorption on a column of Bio Rad AG2–X8 and elution with 4M formic acid. This was recrystallized once from water to give the pure product (197 mg, total yield 89 percent).

c. 1.06 g (3 mmoles) 2 methylthio-2', 3'-O-isopropylidene adenosine was dissolved in a solution of 2.73 ml (30 mmoles) phosphoryl chloride and 1.43 ml (6 mmoles) of tri-n-butylamine in 5 ml dry trimethyl phosphate at 0° C. After 72 hrs at 0° C, the reaction mixture was poured into water (250 ml), the pH adjusted to 1.5 with LiOH solution, and the resulting sticky mass stirred at 70° C for 1 hr during which time most of it dissolved. The solution was adjusted to pH 9 with LiOH and the precipitate of lithium phosphate filtered off. The filtrate was passed through a 2.5 × 35 cm column of Bio Rad AG50W–X4 ($H^+$) which retained the nucleotide. The column was washed with 300 ml water then eluted with 1M $NH_4OH$. The alkaline eluate was evaporated to c. 50 ml then applied to a 3.2 × 28 cm column of Bio-Rad AG2–X8 (formate form) and followed by 500 ml water. Elution was then begun with 4M HCOOH. 15 ml fractions were collected. 2-Methylthioadenosine-5'-monophosphate emerged in fraction 34–43. These fractions were pooled and incorporated to give 260.3 mg white crystalline product (21 percent yield).

EXAMPLE 2

2-Methylthioadenosine-5'-monophosphate in water is passed through a sodium cation exchange resin and the solvent is removed by evaporation in vacuo to give the sodium salt of 2-methylthio-adenosine-5'-monophosphate.

Similarly, the potassium salt of 2-methylthio-adenosine-5'-monophosphate is prepared by passing 2-methylthioadenosine-5'-monophosphate in water through a potassium cation exchange resin and removing the solvent by evaporation in vacuo.

What is claimed is:

1. A pharmaceutical composition for inhibiting or preventing thrombus formation comprising a pharmaceutical carrier and an effective thrombus inhibiting or thrombus preventing amount of -monophosphate or the ammonium, sodium or potassium salt thereof.

2. A pharmaceutical composition according to claim 1 comprising a pharmaceutical carrier and an effective thrombus inhibiting or thrombus preventing amount of 2-methylthioadenosine-5'-monophosphate.

3. A method of inhibiting or preventing thrombus formation which comprises administering internally to an animal an effective thrombus inhibiting or thrombus preventing amount of 2-methylthioadenosine-5'-monophosphate or the ammonium, sodium or potassium salt thereof.

4. A method according to claim 3 in which 2-methylthioadenosine-5'-monophosphate is administered.

* * * * *

PO-1050
(5/69)

UNITED STATES PATENT OFFICE
CERTIFICATE OF CORRECTION

Patent No. 3,678,162                    Dated July 18, 1972

Inventor(s) Mary H. Maguire, Geoffrey R. Gough and Frank Michal

It is certified that error appears in the above-identified patent and that said Letters Patent are hereby corrected as shown below:

Column 1, lines 62 to 75, delete the right-hand formula and in line 65 delete the arrow following the right-hand formula.

Column 2, lines 1 to 24, should appear as follows:

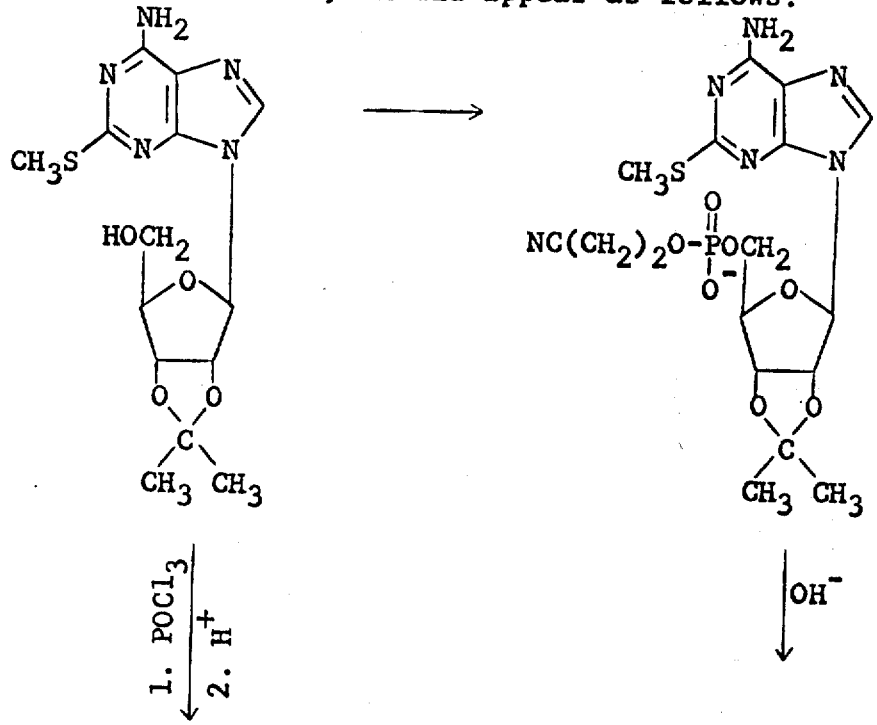

Column 2, lines 31 to 33, in the left-hand formula, that portion of the formula reading $HO-\overset{O}{\underset{OH}{P}}-O-CH$ should read $HO-\overset{O}{\underset{OH}{P}}-O-CH_2$.

Column 5, line 10, "-monophosphate" should read 2-methyl-thioadenosine-5'-monophosphate.

Signed and sealed this 26th day of December 1972.

(SEAL)
Attest:

EDWARD M. FLETCHER, JR.
Attesting Officer

ROBERT GOTTSCHALK
Commissioner of Patents